March 24, 1970 E. M. WORONOWICZ 3,502,873
IMAGING DEVICE FOR RADIOACTIVITY DISTRIBUTION
Filed June 15, 1967
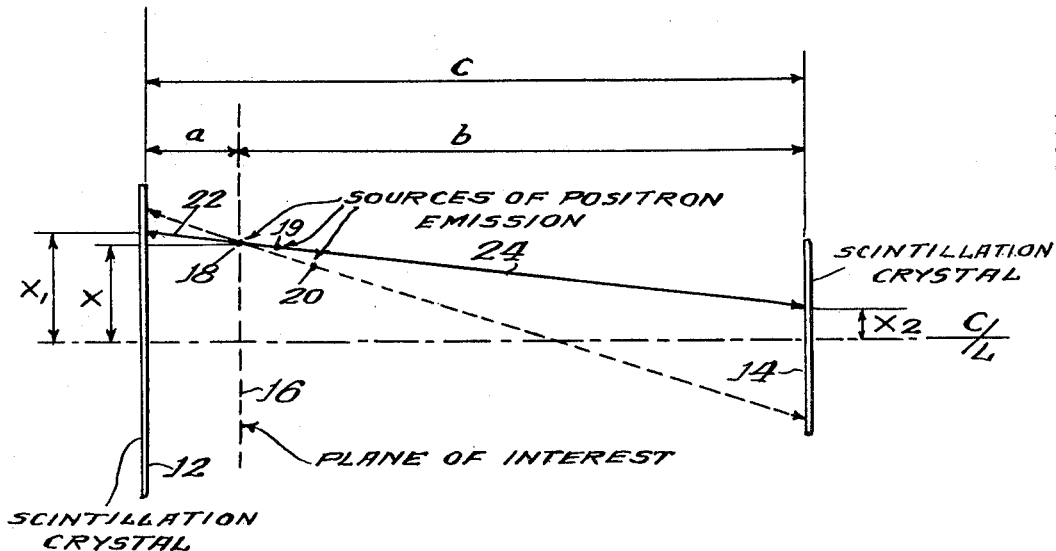
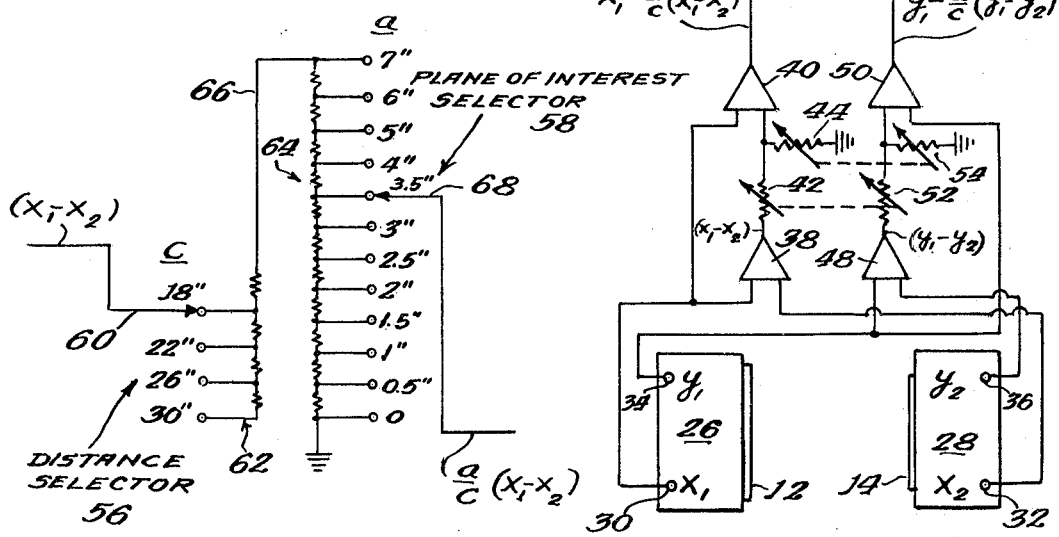
Inventor:
Eric M. Woronowicz
By: Leonard ... 
Attorney United States Patent Office 3,502,873
Patented Mar. 24, 1970

3,502,873
IMAGING DEVICE FOR RADIOACTIVITY
DISTRIBUTION
Eric M. Woronowicz, Chicago, Ill., assignor to Nuclear-Chicago Corporation, Des Plaines, Ill., a corporation of Delaware
Filed June 15, 1967, Ser. No. 646,359
Int. Cl. G01t 1/20; H01j 39/18
U.S. Cl. 250—71.5                                    6 Claims

ABSTRACT OF THE DISCLOSURE

A positron camera with a simplified control circuit for selecting the depth in a subject at which the radioactivity distribution is most sharply imaged.

---

This invention relates to apparatus for imaging the distribution of radioactivity sources and more particularly to the type of imaging device known as the positron camera.

The imaging of radioactivity distribution patterns is in reasonably widespread use for various purposes, particularly in connection with the use of radioactive isotopes in medicine and biology. Instruments for such purposes known as scintillation cameras have been available for the past few years, particularly of the type described in U.S. Patent 3,011,057 of Hal O. Anger. One form of scintillation camera is known as the positron camera. These devices have been described at various places in the scientific literature, for example in Nucleonics, October 1963, p. 56, and the general character and operation of scintillation cameras is now well known to those skilled in the art. However, a brief description of such devices, and particularly of the positron camera, is required for understanding of the present invention.

In the basic form of scintillation camera, there is employed a large crystal (or in some instances a planar assembly of small crystals) upon which there are projected the emissions from the subject (such as an internal organ or other portion of the body of a human patient or on an entire small animal) in which the activity pattern is to be imaged. A collimation shield either of the "pin-hole" type or of the type with parallel closely spaced apertures is interposed between the subject and the crystal, so that each point of detection is identified with a particular line of emission from the subject. An image is formed by dots (commonly oscilloscope point indications) at positions corresponding to the points of detection, and the dot-density pattern, usually formed by recording oscilloscope flashes over a period of time on a stationary photographic medium, shows the distribution pattern, often called a "scintiphoto."

The positron camera differs from the basic form of scintillation camera just described in a manner which eliminates the identification of each point on the detecting crystal with a particular line of emission from the subject. The positron camera is used with positron-emitting isotopes, which produce gamma rays in directly opposite directions upon each positron decay. In addition to the detection of gamma rays by the large-area crystal used in the basic form of scintillation camera, gamma rays emitted in the opposite direction are detected by another crystal parallel to the first. With this arrangement, an enormously higher utilization of the random-direction emissions may be obtained. The path of each gamma-ray pair is calculated from the relation of the points of impingement of the coincidently-emitted gamma rays on the two opposed crystal planes, rather than being determined by collimation, and the scintiphoto is formed by positioning the dots in accordance with these indications, rather than in one-to-one correspondence with the point of impingement on either of the two planes.

For reasons later to be explaned in connection with the description of the present invention, the positron scintiphoto has a plane depth in the subject wherein the image is in best focus, and this plane may be varied by variation of circuit parameters employed in the signal-processing by which the position coordinates in the two detecting planes are converted to position coordinates employed in positioning the dots forming the image.

The conversion of the primary coordinate pulse signals, i.e., the pulse signals representative of the position of detection in the respective planes, to the dot-positioning pulse signals employed in forming the image has been done in a number of ways in the prior art. The basic geometrical considerations involved were known before the present invention, but previous signal-conversion circuits which have accomplished maximum theoretical accuracy of plane selection have required substantial complexity in the variable controls for adjusting or selecting the plane of best definition or focus. Indeed, prior to the present invention, this complexity was considered prohibitive and accuracy substantially less than that theoretically obtainable has heretofore been thought to be necessary for fully practical simplicity.

As will be more fully seen hereinafter, the present invention provides a novel form of signal-conversion and control circuit for such use. The selection of the plane of best focus is made in a manner according in all respects with the theory of operation, yet this is done with a minimum of adjustable circuit components, and a minimum of undesirable cross-coupling between the primary coordinate pulse signals.

Although the principal object of the invention relates to improvement of the positron camera, and the invention is illustrated in the drawing and described below in this connection, it will later be seen that the invention, once understood, may find use in other types of imaging devices for portraying the distribution of radioactivity and similar sources of random-direction straight-line emissions.

Understanding of the invention in both its general and specific aspects will best be obtained from the following description with reference to the drawing, in which:

FIGURE 1 is a diagrammatic representation of the geometry of a positron camera with only a two-dimensional representation of gamma-ray paths, etc., the illustration being limited to the x-coordinate as the variable of position in the various planes, the y-coordinate considerations being identical;

FIGURE 2 is a detailed illustration of a switching-type attenuator corresponding to a portion of the device of FIGURE 3; and FIGURE 3 is a block or logic schematic illustration of a signal-conversion and focus control system according to the invention.

Referring to FIGURE 1, there are shown two scintillation crystals 12 and 14. As illustrated, the crystal 14 is somewhat smaller than the crystal 12. This lack of symmetry is conventional in positron cameras, the smaller crystal normally being an auxiliary for use only with positron emitters, while the larger is also used with collimators for other types of radiation. The size of this crystal, as is well known, is of importance primarily in connection with considerations of efficiency of source utilization, gammas being recorded only when they are detected in coincidence in both planes. It will also be understood that the crystal 14 may be replaced by a bank of small scintillation contours of ordinary construction, but with considerable loss of resolution due to the discrete, rather than continuous, values of position coordinate values which can thus be produced.

As shown in the drawing, the distance from the planar crystal 12 to the "plane of interest" indicated by the dotted line at 16, is $a$ and the distance from the plane 16 to the planar crystal 14 is $b$. The overall spacing between the crystals is indicated as $c$.

A positron source 18 is shown as located in the plane 16. Further positron sources 19 and 20 are shown at locations substantially removed from the plane of interest. The source 18 is shown by arrows 22 and 24, extending in opposite directions from it, as emitting gamma-rays simultaneously along an exemplary straight line formed by the exactly opposite directions of emission which characterize positron annihilation.

The point of intersection of the straight line of emissions with the plane 16 may be calculated from the points of intersection with the respective detection planes 12 and 14. As regards identification of the latter, the most widely used cameras employ relative response of appropriately placed photomultipliers to generate $x$ and $y$ signal pulses indicative of the respective coordinates of the location of the scintillation. However, this is not directly material to the present invention, which is equally useful in the systems which, for example, employ a multitude of light pipes, etc., in the production of coordinate position signals. It will of course be understood that the $x$ and $y$ signals derived from the crystal 12 are the signals which are directly used for oscilloscope spot position where collimators are employed, as must be done when ordinary gamma emitters are used with a single crystal.

With the distances $a$, $b$ and $c$ known, the location of the source 18 in the plane 16 is identified by the points of detection in the crystals 12 and 14. With $x_1$ and $x_2$ being the locations (with respect to a center-line C/L, in the illustration) of the scintillations of the respective crystals, the location of the source may be represented as:

$$x = \frac{b}{c} x_1 + \frac{a}{c} x_2$$

An analog computation network may be designed directly from this equation to produce output pulse signals representative of the $x$-coordinate position of the source in the plane 16 for any particular values of the dimensional constants of the camera system.

The considerations above are identical in the case of the production of signals representative of the $y$-coordinate, and an identical signal-treatment circuit may be employed.

It is highly important in practical use of the positron camera that the parameters be rapidly and simply adjustable. First, considerations of efficiency of source utilization (speed of making a scintiphoto of adequate dot density) make it desirable that the spacing between the crystals be adjustable in accordance with the thickness of the subject, and the size of the activity distribution being imaged also influences the desired spacing. Upon adjustment of the spacing, adjustment of the signal-conversion system is of course required for proper imaging.

Additionally, and perhaps more importantly, the user must be able to make rapid adjustment for changing the plane of best focus or "plane of interest" with a given spacing. For understanding of this, there is illustrated in FIGURE 1 a source 19 which is displaced from the plane of interest, but lies along the path of the positron decay event diagrammatically shown at 22 and 24, and an additional source 20 also displaced from the plane of interest, but shown with an exemplary emission path (shown dotted) also intersecting plane 16 at source 18. It will be seen that the sources 18 and 19 or 18 and 20 will produce identical primary position indications from the two crystals when the emissions occur along a line which includes both sources, but different position indications otherwise. When the analysis is extended to consider all random-direction emissions from these points, the illustrated setting for the plane of interest or best focus at 16 produces the same ultimate position indication for all directions of detected emissions from source 18, but somewhat different position indications for each direction of emission from the sources 19 and 20. Thus the dot pattern corresponding to source distribution in the plane of interest is sharply defined in the image, while activity in other planes, although not eliminated from the image, is relatively diffused. Simple adjustment of the signal-conversion circuit for the plane of interest is thus a requisite for virtually all uses of the positron camera.

When an analog computation network as previously described is sought to be made readily adjustable by the user, severe problems of complexity arise. Corresponding components of the $x$ and $y$ conversion circuits are desirably ganged for simultaneous adjustment. Where the circuits for each coordinate themselves employ ganged variable components, the number of ganged components operated by a single operating member becomes high. To maintain size and mechanical complexity within reasonable limits, the ganged components cannot be greatly spaced apart to avoid cross-coupling of the high-frequency components of the pulses. When it is attempted to solve this problem by shielding, difficulty is encountered with the formation of ground loops.

The present invention flows from the recognition that the relationship representing the location of the source can be advantageously restated for both $x$ and $y$ coordinates as:

$$x = x_1 - \frac{a}{c}(x_1 - x_2)$$

$$y = y_1 - \frac{a}{c}(y_1 - y_2)$$

and that such equations may be used for signal conversion in a simple type of analog computation network, substantially eliminating the complexities and problems just mentioned.

Such a network, in accordance with a preferred embodiment of the invention, is shown in FIGURE 3, wherein the planar scintillation crystals 12 and 14 are schematically represented as being portions of image detectors 26 and 28, of any well known type, but preferably of the type shown in the patent and publication earlier mentioned, which translate the scintillations into position signals. The primary position signals for determination of the $x$ and $y$ coordinates of a source located between the crystals are supplied by these detectors at terminals 30 and 32, and 34 and 36 respectively. These signals are in the form of pulses having amplitudes corresponding to the coordinate values of the positions of incidence upon each detector. The $x_1$ primary position signal is transmitted from terminal 30 to one of the two input terminals of each of two differential amplifiers 38 and 40, and the $x_2$ primary position signal is transmitted from terminal 32 to the other input terminal of the differential amplifier 38. The pulse amplitude output of amplifier 38 is thus proportional to the quantity $(x_1 - x_2)$, the difference between the respective $x$-coordinate primary pulse signals. This signal appears across series connected variable resistances (or other impedances) 42 and 44, the junction point of which is connected to the second input of differential amplifier 40. With the variable resistance 42 proportional to the distance $b$ and the variable resistance 44 proportional to the distance $a$, the signal attenuation produced by the attenuator so formed is $$\frac{a}{a+b}$$

or $a/c$. The pulse signal amplitude fed to the other terminal or amplifier 40 is then indicative of $$\frac{a}{c}(x_1 - x_2)$$

constituting a correction for the $x_1$ signal, and the output signal, indicative of $$x_1 - \frac{a}{c}(x_1 - x_2)$$

represents the x-coordinate position of the intersection of the line of emission with the selected plane of interest or best focus. This signal is coupled to the x-coordinate deflection circuit of an oscilloscope 46 which, together with the y-coordinate signal, produces a dot display representing the distribution of the positron-decay gamma events. (It will be understood that the portion of the system for dot or spot production illustrated is confined to the position-information portion, the unblanking or z signal treatment being of any type, and not shown.)

The analog network is identical as regards the y-coordinate primary signals, the $y_1$ signal being transmitted to one of the two inputs of differential amplifiers 48 and 50, and the $y_2$ signal being transmitted to the other input of the amplifier 48, having an output attenuator formed by variable resistances 52 and 54, ganged for simultaneous operation with 42 and 44, respectively.

There is shown in FIGURE 2 a switching-type attenuator preferably utilized for each of the attenuator networks of FIGURE 3. The signal indicative of $(x_1-x_2)$ is coupled to the movable contact 60 of a distance-selector switch 56. The stationary contacts of switch 56 are each connected to the junctions of a series divider 62, which is serially connected to one end of another divider 64 at 66. Junctions of the latter divider are connected to the stationary contacts of the focal plane selector switch 58, which has a movable contact 68. The resistors of the overall resistance string thus formed are selected to produce any convenient calibrated settings, the distances from the crystal 12 represented by settings of the movable contacts being proportional to the resistance to ground. In the construction shown, the switch 58 is switchable through twelve positions, each representing a different value of the distance $a$, i.e., the distance to the plane of interest 16 from the detector crystal 12, covering from 0.5 inch to 4 inches in ½ inch intervals, and from 4 to 7 inches in one-inch intervals. The value of the circuit resistance between the movable contact 68 and the movable contact 60 is proportional to the distance $b$, i.e., from the plane of interest to the detector crystal 14. Thus the distance selector switch may be calibrated directly for different values of the distance $c$, and in the construction shown is calibrated for 18, 22, 26, and 30 inches.

The output signal at the movable contact 68 of switch 58 is indicative of $$\frac{a}{c}(x_1-x_2)$$

the parameters $a$ and $c$ being set by the respective switches. As earlier indicated, the movable contacts 60 and 68 are ganged with similar contacts of an identical circuit for the y-coordinate. The distance $c$ is generally fixed for any one subject, but may be varied as previously described, and the distance $a$ can be varied to select the plane most sharply imaged at any desired point or depth within the subject. For use with ordinary gamma-ray radiation, the conversion circuit is disabled by merely placing the plane of interest setting at 0, in which case of course a suitable collimator is interposed between the subject and the crystal 12.

The principles of the invention, herein described in connection with a piston scintillation camera, can be adapted to other devices for imaging the distribution of radioactivity and similar sources of random-direction straight-line emissions. Other variants will likewise be found. For example, it will be observed that the subtraction of the correction signal is merely one form of algebraic combination which may be used for the correction, dependent on the choice of coordinate value assignments and the polarity of the signals produced. Accordingly, the scope of the invention should not be considered limited by the embodiment illustrated and described, but should be determined only by the definitions of the appended claims, and equivalents thereof.

What is claimed is:
1. In apparatus for imaging the distribution of radioactivity and similar sources of random-direction straight-line emissions in a carrier medium, such apparatus comprising:
  (a) means for detecting the traversal of spaced parallel planes by the emissions,
  (b) means responsive to the detecting means for producing primary pulse signals representative of at least one position coordinate of the points of traversal of the respective planes,
  (c) means responsive to said primary pulse signals for producing second pulse signals representative of the coordinate value at the point of traversal of a third parallel plane by the emissions, said third plane passing through the carrier medium, and
  (d) means responsive to the second pulse signals for producing positioned indications of distinct emissions to form an image wherein the distribution of sources which lie in the third plane is most sharply focused,
the improved construction wherein said means for producing the second pulse signals comprises:
  (e) means for producing differential pulse signals of amplitude proportional to the difference between the respective primary pulse signals,
  (f) means for altering the amplitude of the differential pulse signals by a preset ratio to form correction pulse signals, and
  (g) means for algebraically combining the correction pulse signals thus formed and the primary pulse signals from one of the first two planes to form the second pulse signals,
  (h) variation of said amplitude alteration thus varying the plane of sharpest focus, the amplitude alteration being the ratio of the distance between said one of said first two planes and the plane of sharpest focus to the distance between said first two planes.

2. A scintillation camera comprising the apparatus of claim 1 wherein the detecting means comprise planar scintillation detectors in the first two planes adapted for detection of the gamma-rays emitted in opposite directions in positron decay occurring therebetween.

3. The imaging apparatus of claim 1 wherein the amplitude-altering means consists essentially of an impedance having a variable output tap thereon, the plane of sharpest focus being set by adjustment of the tap.

4. The imaging apparatus of claim 3 wherein the impedance has a variable input tap and a variable output tap, the positions of the input and output taps being independently adjustable, so that one may be set to correspond to the distance between the first two planes, and the other may thereupon be set to select successive planes of sharpest focus.

5. The imaging apparatus of claim 1 wherein the sources are between the detection planes, the amplitude-altering means consisting of a resistive attenuator.

6. The imaging apparatus of claim 5 wherein the attenuator has a variable input tap settable for correspondence to the distance between said two detection planes and a variable output tap for selection of planes of sharpest focus at distances from said one plane which are independent of the distance between detection planes.

References Cited

UNITED STATES PATENTS 3,011,057 11/1961 Anger _____ 250—71.5
3,209,201 9/1965 Anger _____ 250—71.5 X
3,327,116 6/1967 Loveday _____ 250—71.5
3,329,814 7/1967 Anger.

RALPH G. NILSON, Primary Examiner

A. B. CROFT, Assistant Examiner